(12) United States Patent
Sinclair et al.

(10) Patent No.: US 6,727,707 B2
(45) Date of Patent: Apr. 27, 2004

(54) METHOD AND APPARATUS FOR A DOWNHOLE ANTENNA

(75) Inventors: Paul L. Sinclair, Austin, TX (US); Joseph K. Clontz, Austin, TX (US)

(73) Assignee: CBG Corporation, Austin, TX (US)

(*) Notice: Subject to any disclaimer, the term of this patent is extended or adjusted under 35 U.S.C. 154(b) by 9 days.

(21) Appl. No.: 10/254,752

(22) Filed: Sep. 25, 2002

(65) Prior Publication Data
US 2004/0056663 A1 Mar. 25, 2004

(51) Int. Cl.[7] .............................. G01V 3/10; G01V 3/18
(52) U.S. Cl. .................... 324/369; 324/339; 324/343
(58) Field of Search ................................ 324/369, 333, 324/334, 339, 343; 343/719

(56) References Cited

U.S. PATENT DOCUMENTS

| | | |
|---|---|---|
| 3,209,323 A | 9/1965 | Grossman, Jr. |
| 4,806,928 A | 2/1989 | Vereruso |
| 4,928,088 A | 5/1990 | Jorion et al. |
| 5,008,664 A | 4/1991 | More et al. |
| 5,661,402 A | * 8/1997 | Chesnutt et al. ............ 324/338 |

* cited by examiner

Primary Examiner—N. Le
Assistant Examiner—Reena Aurora
(74) Attorney, Agent, or Firm—Campbell Stephenson Ascolese LLP

(57) ABSTRACT

A method and apparatus for a downhole antenna comprising a housing having an outer surface and a longitudinally bored inner cavity, the outer surface having a first slot and a corresponding second slot extending from the outer surface to the longitudinally bored inner cavity; a first removable downhole antenna segment disposed in the first slot in a first transverse cross section of the housing, the first removable downhole antenna segment comprising at least one coil to inductively couple a signal from the longitudinally bored inner cavity to the earth formation. A second removable downhole antenna segment, interchangeable with the first removable downhole antenna segment, disposed in the corresponding second slot, the second slot in a second transverse cross section of the housing, the second removable downhole antenna segment comprising at least one coil to inductively couple a signal from the earth formation to the longitudinally bored inner cavity.

38 Claims, 3 Drawing Sheets

METHOD AND APPARATUS FOR A DOWNHOLE ANTENNA

BACKGROUND

1. Field of the Invention

The present invention is related to the field of oil exploration. In particular, the present invention is related to a method and apparatus for a down-hole antenna.

2. Description of the Related Art

Logging tools are used in boreholes drilled into the earth's formation to search for fluids and other minerals. In measurement while drilling (MWD) operations, measurements of the earth's formation are obtained while the borehole is being drilled. Simultaneously with the drilling of the borehole, measurements of the earth's formation are obtained at several distances along the axis of the borehole. Typically, a sensor used to measure characteristics of the earth's formation comprises a cylindrical body (housing) that forms a section of a drillstring. In the case of a sensor that measures resistivity of the earth's formation (i.e., a resistivity probe), the sensor has at least one transmitting antenna and one or more receiving antennas disposed along the length of the housing. The transmitting antenna generates electromagnetic waves that propagate through the earth's formation in the region surrounding the borehole, and the receiving antenna detects the waves as they pass the respective receiving antennas. By measuring the amplitude and the phase of the received waves the resistivity of the earth's formation may be determined.

The antennas of the resistivity sensor comprise one or more coils of wire that are placed in grooves around the circumference of the housing and filled with non-conductive material to permit the transmitted waves to couple from the antenna to the earth's formation. Each antenna is electrically connected by wires to corresponding transmit and receive circuitry. The transmit and receive circuitry may be placed either in cavities on the collar itself or on a probe that is coaxially located within the collar. In the case of the coaxial probe, the connection with the antenna is usually via electrical wires or spring loaded contacts that connect the probe to the antennas. However, in both cases during MWD operations as the collar is subject to severe stresses (e.g., shear, torsion, etc.) and as the collar is subject to wear and erosion, the antenna coils and the wires that connect the antenna coils to the corresponding transmit and receive circuitry are subject to fail.

A failure of a sensor during drilling operations is very expensive and time consuming. Not only does the sensor have to be pulled out of the borehole, but also, the sensor (weighing several hundred pounds) has to be shipped to a repair facility for rebuilding.

BRIEF SUMMARY OF THE DRAWINGS

Example embodiments of the present invention are illustrated in the accompanying drawings. The accompanying drawings, however, do not limit the scope of the present invention. Similar references in the drawings indicate similar elements.

DETAILED DESCRIPTION

Figure 1:
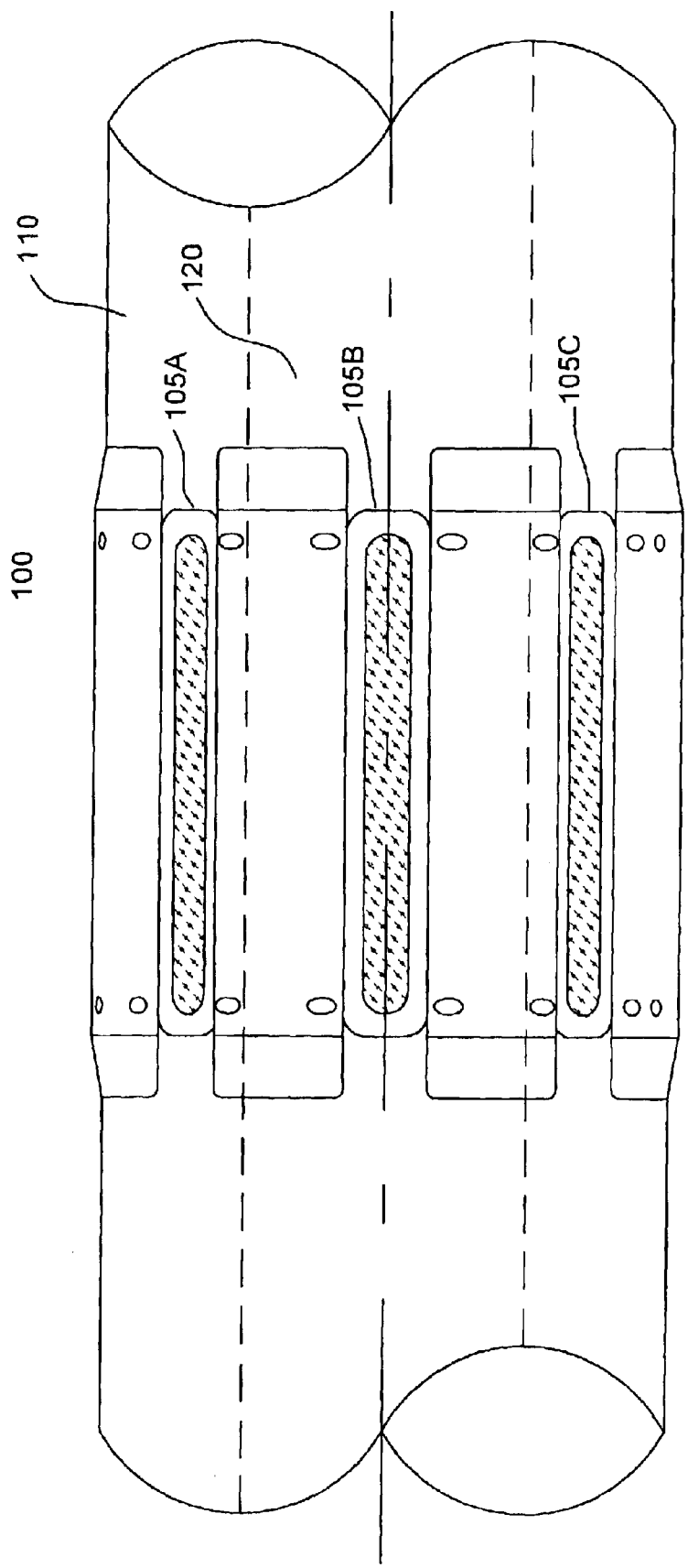
FIG. 1 illustrates a perspective view of a downhole antenna according to one embodiment of the invention.

Described is a method and apparatus for a downhole antenna. The downhole antenna comprises one or more removable downhole antenna segments; the removable downhole antenna segments are disposed around the circumference of a housing (e.g., a collar). In one embodiment of the invention, the housing comprises a cylinder having a longitudinally bored inner cavity. In one embodiment of the invention, the removable downhole antenna segments that comprise the downhole antenna are radially disposed around the circumference of the same transverse cross section of the housing. In other embodiments of the invention, the removable downhole antenna segments are radially disposed around different transverse cross sections of the housing. The outer surface of the housing has one or more slots that extend in a radial direction from the outer surface of the housing to the longitudinally bored inner cavity. Each slot has therein a removable downhole antenna segment, the removable downhole antenna segment comprising a coil, the coil having at least one turn, to inductively couple a signal from the longitudinally bored inner cavity to the earth's formation, and vice versa. In addition, each removable downhole antenna segment is removable from the surface of the housing.

In one embodiment of the invention, within the longitudinally bored inner cavity, coaxially disposed with the housing, is a probe, e.g., a resistivity probe. The probe comprises circuitry e.g., transmitting and receiving circuitry. In the case of a transmitting antenna, (i.e. an antenna that transmits a signal) the transmitting circuitry on the probe generates a signal and drives at least a coil within the probe. The coil within the probe inductively couples the generated signal, or a portion thereof, to the one or more removable downhole antenna segments in the slots of the housing. In particular, the coil in the probe inductively couples the generated signal to one or more coils in the one or more removable downhole antenna segments. The one or more coils in the one or more removable downhole antenna segment couples the induced signal in the coil to the earth's formation.

In one embodiment of the invention, the circuitry e.g., the transmitting and the receiving circuitry are disposed on the housing e.g., within cavities on the housing. The transmitting circuitry generates a signal that drives a coil within the cavity and the coil inductively couples the signal to one or more coils on the removable downhole antenna segment. In other embodiments of the invention, the transmitting circuitry generates a signal that drives a coil within the cavity and the coil inductively couples the signal to a first coil on the removable downhole antenna segment. The first coil may inductively couple the signal to at least a second coil which in turn couples the signal to the earth's formation. Thus, there is no physical electrical connection to couple the signal generated by the circuitry disposed on the housing to one or more coils on the removable downhole antenna segments which couple the signal induced therein to the earth's formation.

In other embodiments of the invention, each removable downhole antenna segment may have a first coil and a second coil. The first coil is located near the longitudinally bored inner cavity of the housing and the second coil is located near the outer surface of the housing. The first coil on each removable downhole antenna segment couples the signal induced in the first coil, from a coil in the probe, to the second coil. The second coil on each removable downhole antenna segment couples the signal induced therein to the earth's formation. Thus, there is no physical electrical connection coupling the signal generated by circuitry in the probe to the earth's formation.

In the case of a receiving antenna, the transmitted signal is received, e.g., after being propagated through the earth's formation, by one or more coils in each of the one or more removable downhole antenna segments that comprise the receiving antenna, and the received signal from the one or more coils on the one or more removable downhole antenna segments may be inductively coupled to at least one of one or more coils in the probe, and/or one or more coils located within cavities in the housing. In one embodiment of the invention, the removable downhole antenna segment that receives a signal is substantially similar to the removable downhole antenna segment that transmits a signal. Therefore, in one embodiment of the invention, the removable downhole antenna segments comprising a receiving antenna are interchangeable with the removable downhole antenna segments comprising the transmitting antenna.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one of ordinary skill in the art to effect such feature, structure, or characteristic in connection with other embodiments whether or not explicitly described. Parts of the description are presented using terminology commonly employed by those of ordinary skill in the art to convey the substance of their work to others of ordinary skill in the art.

In the following description and claims, the terms "coupled" and "connected", along with derivatives such as "communicatively coupled" may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct physical contact with each other, but still co-operate or interact with each other.

FIG. 1 illustrates a perspective view of a downhole antenna according to one embodiment of the invention. As illustrated in FIG. 1, the downhole antenna 100 comprises one or more removable downhole antenna segments 105A–C, wherein the removable downhole antenna segments 105A–C are disposed around the circumference of a housing 110 (e.g., a collar).

In one embodiment of the invention, the housing 110 comprises a solid cylinder that has a longitudinally bored inner cavity 120. In one embodiment of the invention, the removable downhole antenna segments 105A–C of the downhole antenna 100 are radially disposed, e.g., in a circular pattern, at or near the circumference of the same transverse cross section of the housing. In other embodiments of the invention, the removable downhole antenna segments 105A–C are radially disposed e.g., in a helical pattern around different transverse cross sections of the housing.

Figure 2:
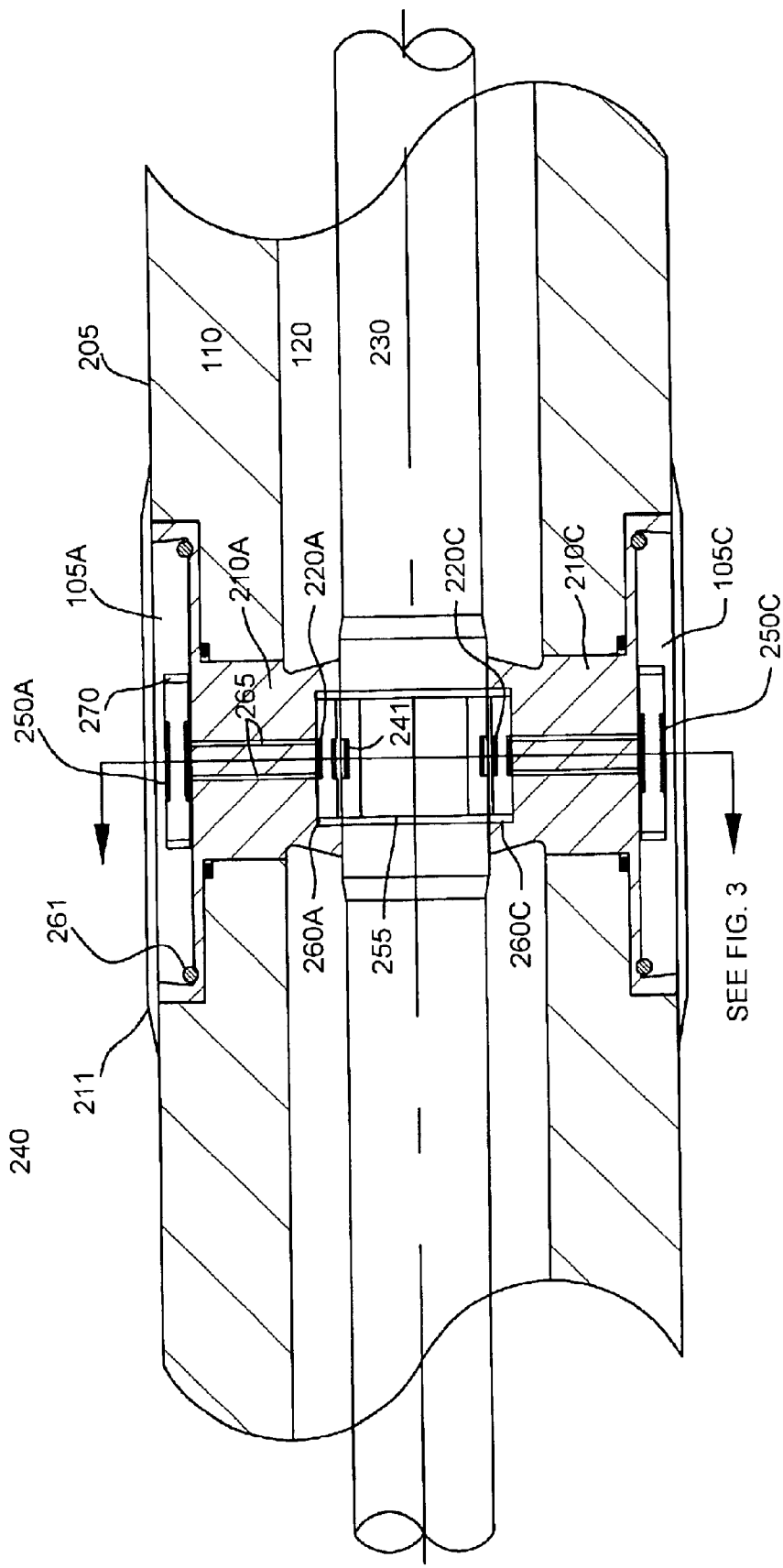
FIG. 2 illustrates a longitudinal cross-sectional view of a downhole antenna according to one embodiment of the invention.
Figure 3:
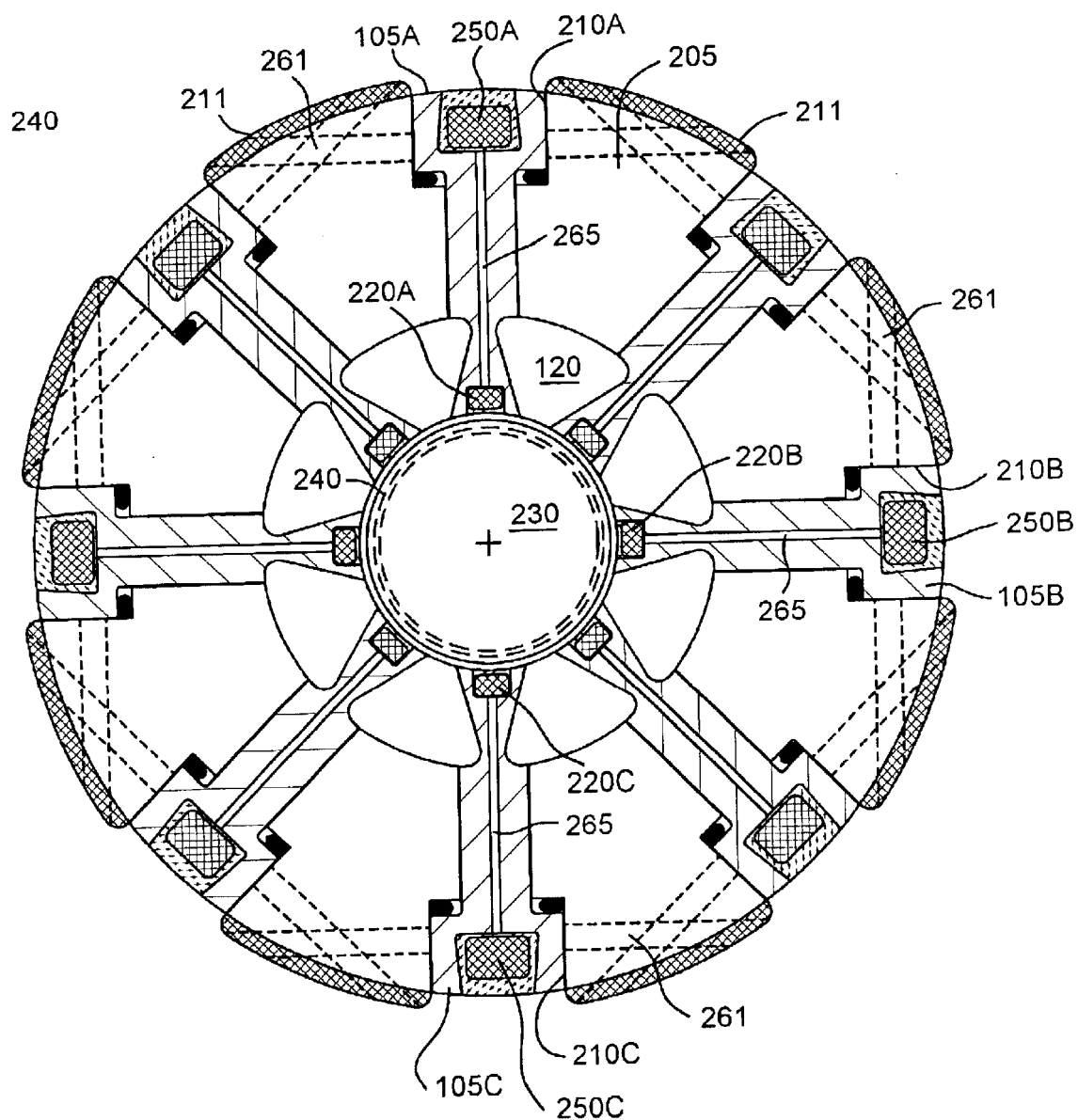
FIG. 3 illustrates a transverse cross-sectional view of a downhole antenna according to one embodiment of the invention.

FIG. 2 illustrates a longitudinal cross-sectional view of a downhole antenna according to one embodiment of the invention. FIG. 3 illustrates a transverse cross-sectional view of a downhole antenna according to one embodiment of the invention. As illustrated in FIGS. 2 and 3, housing 110 comprises a solid cylinder having an outer surface 205 and a longitudinally bored inner cavity 120. Within the longitudinally bored inner cavity 120 is a probe 230. In one embodiment of the invention, from at or near the outer surface 205 of the housing 110, extending in a radial direction toward the probe 230, are one or more slots 210A–C. In one embodiment of the invention, the removable downhole antenna segments 105A–C are disposed in the slots 210A–C that are ninety degrees apart. In other embodiments of the invention, the removable downhole antenna segments 105A–C may be disposed in slots 210A–C that are less than or greater than ninety degrees apart. Each slot 210A–C has therein a corresponding removable downhole antenna segment 105A–C that is secured using e.g., retaining pins 261 to housing 110. Although the embodiment of FIGS. 2 and 3 illustrate slots 210A–C, other embodiments of the invention may have other openings e.g., substantially wedge shaped pieces extending a substantial length of the housing 110, wherein each substantially wedge shaped piece comprises a removable downhole antenna segment. In one embodiment of the invention, the removable downhole antenna segments 105A–C are sunk below the outer surface 205 of housing 110, in other embodiments of the invention the removable downhole antenna segments 105A–C are flush with the outer surface 205 of housing 110. In one embodiment of the invention, a hard facing 211 to protect the removable antenna segments 105A–C, surrounds the portion of the collar between the removable downhole antenna segments 105A–C. In one embodiment of the invention, the removable downhole antenna segments 105A–C extend into the longitudinally bored inner cavity 120, although it may not.

Each removable downhole antenna segment 105A–C comprises a coil 220A–C to inductively couple a signal from the longitudinally bored inner cavity 120 to the earth's formation 240 and vice versa. In one embodiment of the invention, in the case of a transmitting antenna the transmitting circuitry (not shown) on the probe 230 generates a signal and drives the coil 241 in the probe 230. Although the embodiment of FIG. 2 illustrates a single coil 241 in the probe 230, alternate embodiments of the invention may have multiple coils within probe 230, such that, each of the multiple coils in probe 230 inductively couples a signal having the same or different frequency to one or more of the coils in each of the removable downhole antenna segments 105A–C. In one embodiment of the invention, the transmitting antenna and the receiving antenna are identical and interchangeable. Thus, each removable downhole antenna segment 105A–C can be used as a transmitting antenna segment or as a receiving antenna segment.

In one embodiment of the invention, the circuitry e.g., the transmitting and the receiving circuitry is disposed on the housing 110 e.g., within cavities (not shown) in the housing 110. The circuitry in the cavity in the housing 110 generates a signal that drives a coil in the cavity and the coil in the cavity inductively couples the signal to a coil on the removable downhole antenna segment. In other embodiments of the invention, the circuitry in the cavity in the housing 10 generates a signal that drives a coil in the cavity and the coil inductively couples the signal to a first coil on the removable downhole antenna segment. The first coil may inductively couple the signal to at least a second coil which in turn couples the signal to the earth's formation. Thus, there is no physical electrical connection coupling the signal generated by the circuitry disposed in cavities in the housing 110 to the earth's formation 240.

As seen above, the downhole antenna 100 comprises a plurality of removable downhole antenna segments 105A–C, and each removable downhole antenna segment 105A–C comprises one or more coils 220A–C that inductively couples a signal from one or more coils 241 in probe 230. Therefore, a redundancy is built into the design of antenna 100, such that, if one or more coils 220A–C on one or more removable downhole antenna segments 105A–C fail, the sensor employing the antenna design would continue to be operational. For example, if coil 220A on an antenna that transmits a signal into the earth formation 240 fails by e.g., having a short circuit, the total induced voltage is reapportioned on coils 220B and 220C, and the flux coupled into the earth's formation 240 is substantially the same as that before the occurrence of the short circuit. A similar situation occurs in the case of a failure of a coil on an antenna that receives a signal. In this case, the gain of the antenna that receives the signal is reduced, however, the antenna continues to operate. Thus, a redundancy is built into the design of antenna 100. The failed coil is easily replaced from the outer surface 205 of housing 110 by removing retaining pin 261. The failed removable downhole antenna segment i.e., the removable antenna segment comprising the failed coil may be replaced without the removal of probe 230 from the housing 110. Due to the inductive coupling employed between the coil 241 in the probe 230 and the coils 220A–C in the removable downhole antenna segments 105A–C, the design of the downhole antenna 100 is more robust as compared with existing designs wherein a physical connection is employed between circuitry in the probe 230 and the antenna on the surface of housing 110.

Since probe 230 is coaxial with the housing 110, and since the removable downhole antenna segments 105A–C are disposed in a cross-section radially around the housing 110, during MWD operations any transverse motion of the probe 230 relative to the housing 10 maintains the performance of antenna 10. This is because, although the spacing between the probe 230 and the housing 110 is reduced on one side, the spacing between the probe 230 and the housing 10 is increased on the opposite side. This causes the total signal induced in antenna 100 to be unaltered, since the total signal induced in the antenna 100 is the sum of the signals induced in each of the coils 220A–C in the corresponding removable downhole segments 105A–C. Any relative axial motion between the probe 230 and the housing 110 has no effect on the performance of antenna 100 because the gap between the probe 230 and the housing 110 is unchanged.

In one embodiment of the invention, for a removable downhole (receiver) antenna, the coils on the removable downhole antenna segments 105A–C that couple the signal from the earth's formation 240 to the probe 230 are spaced 90 degrees apart. Other configurations for spacing the receiver coils e.g., greater than 90 degrees or less than 90 degrees may be utilized in accordance with the invention. By spacing the coils on the removable downhole antenna segments 105A–C ninety degrees apart, in the case of a resistivity sensor, the need to rotate the sensor, and in particular the need to rotate the housing 10, in order to obtain the direction of a particular strata in the earth's formation is eliminated. The direction of the particular strata may be determined by determining the maximum and minimum resistivity value obtained by analyzing the received transmissions from the four orthogonally spaced coils. In alternate embodiments of the invention, the received transmissions from the four coils are converted to a vector representation of the current induced in the coils. Using the vector representations of the induced currents and vector algebra the direction of the particular strata with respect to a marking on the collar (commonly called high-side) may be determined. Thus, the downhole antenna 100, and in particular the coils on the removable downhole antenna segments 105A–C comprising the downhole antenna 100 may be used to obtain an azimuthal resistivity measurement.

The coil 241 in probe 230 illustrated in FIG. 2 is wound on a core, e.g., a bobbin core 255, and has an axis coaxial to the longitudinal axis of probe 230. Although the embodiment of FIG. 2 uses a monolithic bobbin core, other embodiments of the invention, may use non-monolithic cores e.g., cores made of two or more pieces clamped together. Other types of cores 255 may include e.g., 'C' shaped cores, 'E' shaped cores, 'U' shaped cores, or tubular cores etc. The signal from coil 241 in probe 230 is induced in coils 220A–C in the corresponding removable downhole antenna segments 105A–C via inductive coupling. In one embodiment of the invention, the induced signal in each of the coils 220A–C is coupled to the earth's formation 240 by each of the coils 220A–C of the removable downhole antenna segments 105A–C. In one embodiment of the invention each of the coils 220A–C have their coil axis parallel to the longitudinal axis of the collar 110.

In other embodiments of the invention, each removable downhole antenna segment 105A–C has corresponding first coils 220A–C induce a signal in corresponding second coils 250A–C. The first coils 220A–C are located near the longitudinally bored inner cavity 120 of the housing 110 and the corresponding second coils 250A–C are located near the outer surface 205 of the housing 110. Although the embodiments of FIGS. 2 and 3 illustrate the second coils 250A–C near the circumference of housing 110, disposed radially away from the corresponding first coils 220A–C in the same transverse cross-section of the housing as the first coils 220A–C, other embodiments of the invention may have the corresponding second coils 250A–C disposed near the circumference of housing 110, in any transverse cross-section of housing 100, above or below the transverse cross-section of the first coils 220A–C, so long as the second coils are located on the corresponding removable downhole antenna segments 105A–C. The first coils 220A–C on each removable downhole antenna segment 105A–C couples the signal induced in the corresponding first coils 220A–C, from the coil 241 in the probe 230, to the corresponding second coils 250A–C. The second coils 250A–C on each removable downhole antenna segment 105A–C couples the signal induced by each of the first coils 220A–C to the earth's formation 240. In one embodiment of the invention, in order to effect the maximum signal transfer from the second coils 250A–C into the earth's formation 240 the second coils 250A–C are encapsulated in insulation material e.g., epoxy, composite, rubber, or a combination thereof. In one embodiment of the invention, the signal is conveyed to the second coils 250A–C via conductors 265 that carry the current flowing in the first coils 220A–C to corresponding second coils 250A–C. In other embodiments of the invention, the signal may be induced in the corresponding second coils 250A–C via inductive coupling. The signal induced in the second coils 250A–C is coupled by each of the corresponding second coils 250A–C into the earth's formation 240. Thus, each removable downhole antenna segment 105A–C may have one or more coils to couple a signal generated by the probe 230 to the earth's formation 240. Each of the one or more coils used to couple a signal generated by the probe 230 to the earth's formation 240 have low inductance and low impedance. In one embodiment of the invention, the inductance of the coils has a range 0.3 to 30 microhenrys, and an impedance of 1 to 100 ohms.

In one embodiment of the invention, each of the first coils 220A–C is wound on a corresponding 'C' shaped core 260A–C such that the ends of the 'C' shaped core are aligned with the bobbin rails of bobbin core 255 for maximum flux transfer between the coil 241 in the probe 230 and the first coils 220A–C. In one embodiment of the invention, the ends of the 'C' shaped cores have a curved (concave) shape to further effect maximum flux transfer between coil 241 and the first coils 220A–C, by minimizing the gap between the respective cores.

In one embodiment of the invention each of the second coils 250A–C are wound on a cylindrical or bar shaped core 270 to more effectively couple the signal induced therein into the earth's formation 240 and vice versa.

In one embodiment of the invention, the cores i.e., the bobbin core 255, the 'C' shaped core 260 and the bar shaped core 270 are made of ferrite. Other embodiments of the invention may use other magnetically permeable materials in the cores e.g., powdered-iron. In one embodiment of the invention, the signal inductively coupled in coils 220A–C have a frequency in the range of 200 KHz to 2 MHz. In other embodiments of the invention signals with frequencies other than 200 KHz to 2 MHz may be used.

Although the embodiments of FIGS. 2 and 3 illustrate removable downhole antenna segments 105A–C with one or more coils, each removable downhole antenna segments 105A–C may have other components, e.g., tuning capacitors (not shown) to tune each antenna 100, and in particular to tune each coil, e.g., coils 220A–C and coils 250A–C, on the removable downhole antenna segments 105A–C to a particular frequency. In one embodiment of the invention, each removable downhole antenna segment 105A–C may have other circuitry, e.g., power supply circuits, amplification circuits, filter circuits etc. for use e.g., in power generation and in the transmission and reception of signals.

In one embodiment of the invention, a coil e.g., coil 241 in the probe 230 may induce an alternating signal in one or more coils 220A–C in the corresponding removable downhole antenna segments 105A–C. Rectification and filter circuits in the removable downhole antenna segments 105A–C may rectify and filter the induced signal from the one or more coils 220A–C to generate a corresponding direct current (DC) voltage which may be used to drive amplification and other circuits on the removable downhole antenna segments 105A–C.

In one embodiment of the invention, the removable downhole antenna segments 105A–C may be used as an antenna in a downhole magnetic resonance imaging (MRI) sensor used in evaluation of the earth's formation. A first set of coils 220A–C on the removable downhole antenna segments 105A–C may have induced therein a signal from a first coil 241 in probe 230. The induced signal may be coupled to the earth's formation 240 as a time varying magnetic field. In one embodiment of the invention, a second coil (not shown) in probe 230 induces an alternating current (AC) in a second set of coils (not shown) in removable downhole antenna segments 105A–C. This induced signal in the second set of coils may be used to generate a steady (non-changing) magnetic field. Other embodiments of the invention may use a permanent magnet or an electromagnet (e.g., a magnet made of a coil with a magnetically permeable core) or a combination thereof to generate the steady magnetic field. Other coils (not shown) may also be employed on the removable downhole antenna segments 105A–C to control the gradient of the steady magnetic field. The antenna 100 employing the removable downhole antenna segments 105A–C is particularly useful as an antenna in a downhole MRI sensor because the high power associated with the inductive coupling of the time varying signal in MRI into the earth's formation may cause conventional antennas to fail. By coupling the signal from the coaxial probe 230 into the coils 220A–C in a downhole MRI sensor a redundancy is built into the antenna as explained earlier. Also, a failed coil on a removable downhole antenna segment 105A–C is easily replaced from the outer surface 205 of housing 110 by the removal of retaining pin 261 and the replacement of the failed removable downhole antenna segment 105A–C without disassembly of the downhole MRI probe 230 from the housing 110.

Thus, a method and apparatus have been disclosed for a downhole antenna. While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. An apparatus to evaluate an earth formation comprising:
   a housing having an outer surface and a longitudinally bored inner cavity, the outer surface having a slot that extends from the outer surface into the longitudinally bored inner cavity; and
   a removable downhole antenna segment disposed in the slot, the removable downhole antenna segment comprising at least one coil to inductively couple a signal from the longitudinally bored inner cavity to the earth formation.

2. The apparatus of claim 1 wherein the removable downhole antenna segment comprises a first coil and a second coil, the first coil disposed near the longitudinally bored inner cavity to inductively couple the signal from a coil on a probe, the probe disposed within the longitudinally bored inner cavity, to the second coil disposed near the outer surface, the second coil to couple the signal to the earth formation.

3. The apparatus of claim 2 wherein the coil on the probe, the first coil and the second coil each has an axis that is oriented in a direction parallel to a longitudinal axis of the housing.

4. The apparatus of claim 2 wherein the coil on the probe, the first coil, and the second coil, each have a core comprising permeable magnetic material.

5. The apparatus of claim 4 wherein the core of the first coil comprises any one of a 'C' shaped core, a 'U' shaped core, and an 'E' shaped core.

6. The apparatus of claim 4 wherein the core of the coil on the probe comprises any one of a bobbin core, two or more 'C' shape cores clamped together, a 'C' shaped core, a 'U' shaped core, a cylindrical core, and an 'E' shaped core.

7. The apparatus of claim 4 wherein the core of the second coil comprises any one of an 'I' shaped core, a 'C' shaped core, a bar core, and a cylindrical shaped core.

8. The apparatus of claim 4 wherein the core of the first coil has ends that are concave shaped.

9. The apparatus of claim 2 wherein the first coil and the second coil, on the removable downhole antenna segment, are disposed on different transverse cross sections of the housing.

10. The apparatus of claim 1 further comprising a plurality of the removable downhole antenna segments radially disposed in a transverse cross section of the housing in a corresponding plurality of slots around the housing.

11. The apparatus of claim 10 wherein the plurality of the removable downhole antenna segments are orthogonally disposed in the transverse cross section of the housing.

12. The apparatus of claim 1 further comprising the removable downhole antenna segment having at least one of a third coil and a permanent magnet to generate a static magnetic field.

13. The apparatus of claim 1 wherein the removable downhole antenna segment is removable via the outer surface of the housing.

14. An apparatus to evaluate an earth formation comprising:
a housing having an outer surface and a longitudinally bored inner cavity, the outer surface having a slot that extends from the outer surface into the longitudinally bored inner cavity; and
a removable downhole antenna segment disposed in the slot, the removable downhole antenna segment comprising at least one coil to inductively couple a signal from the earth formation to the longitudinally bored inner cavity.

15. The apparatus of claim 14 wherein the removable downhole antenna segment comprises a first coil and a second coil, the second coil disposed near the outer surface to couple a signal from the earth formation to the first coil, the first coil disposed near the longitudinally bored inner cavity to inductively couple the signal from the first coil to a coil on a probe, the probe disposed within the longitudinally bored inner cavity.

16. The apparatus of claim 15 wherein the coil on the probe, the first coil and the second coil each has an axis that is oriented in a direction parallel to a longitudinal axis of the housing.

17. The apparatus of claim 15 wherein the coil on the probe, the first coil, and the second coil, each have a core comprising permeable magnetic material.

18. The apparatus of claim 17 wherein the core of the first coil comprises any one of a 'C' shaped core, a 'U' shaped core, and an 'E' shaped core.

19. The apparatus of claim 17 wherein the core of the coil on the probe comprises any one of a bobbin core, two or more 'C' shape cores clamped together, a 'C' shaped core, a 'U' shaped core, a cylindrical core, and an 'E' shaped core.

20. The apparatus of claim 13 wherein the core of the second coil comprises any one of an 'I' shaped core, a 'C' shaped core, a bar core, and a cylindrical shaped core.

21. The apparatus of claim 17 wherein the core of the first coil has ends that are concave shaped.

22. The apparatus of claim 15 wherein the first coil and the second coil, on the removable downhole antenna segment, are disposed on different transverse cross sections of the housing.

23. The apparatus of claim 14 further comprising a plurality of the removable downhole antenna segments radially disposed in a transverse cross section of the housing in a corresponding plurality of slots around the housing.

24. The apparatus of claim 23 wherein the plurality of the removable downhole antenna segments are orthogonally disposed in the transverse cross section of the housing.

25. The apparatus of claim 14 wherein the removable downhole antenna segment is removable via the outer surface of the housing.

26. An apparatus to evaluate an earth formation comprising:
a housing having an outer surface and a longitudinally bored inner cavity, the outer surface having a first slot and a corresponding second slot, the first slot and the corresponding second slot extending from the outer surface into the longitudinally bored inner cavity;
a first removable downhole antenna segment disposed in the first slot, the first slot in a first transverse cross section of the housing, the first removable downhole antenna segment comprising at least one coil to inductively couple a signal from the longitudinally bored inner cavity to the earth formation; and
a second removable downhole antenna segment disposed in the corresponding second slot, the second slot in a second transverse cross section of the housing, the second removable downhole antenna segment comprising at least one coil to inductively couple a signal from the earth formation to the longitudinally bored inner cavity.

27. The apparatus of claim 26 wherein the first and the second removable downhole antenna segments comprise a first coil and a second coil, the first coil disposed near the longitudinally bored inner cavity and the second coil disposed near the outer surface.

28. The apparatus of claim 27 further comprising the first removable downhole antenna segment and the second removable downhole antenna segment having at least one of a third coil and a permanent magnet to generate a static magnetic field.

29. The apparatus of claim 27 wherein the first coil and the second coil, on any one of the removable downhole antenna segments, are disposed on different transverse cross sections of the housing.

30. The apparatus of claim 26 further comprising:
a first plurality of the removable downhole antenna segments radially disposed in the first transverse cross section of the housing in a first plurality of slots around the housing; and
a second plurality of the removable downhole antenna segments corresponding with the first plurality of the removable downhole antenna segments, radially disposed in the second transverse cross section of the housing in a corresponding second plurality of slots around the housing.

31. The apparatus of claim 26 wherein the first plurality of the removable downhole antenna segments are orthogonally disposed in the first transverse cross section of the housing and the second plurality of the removable downhole antenna segments are orthogonally disposed in the second transverse cross section of the housing.

32. The apparatus of claim 26 wherein the first and the second removable downhole antenna segments are removable via the outer surface of the housing.

33. The apparatus of claim 26 wherein the first removable downhole antenna segment and the second removable downhole antenna segment are interchangeable.

34. A method to evaluate an earth formation comprising:
using in a borehole, a housing having an outer surface and a longitudinally bored inner cavity, the outer surface having a first slot and a corresponding second slot, the first slot and the corresponding second slot extending from the outer surface into the longitudinally bored inner cavity;

using in the borehole, a first removable downhole antenna segment disposed in the first slot, the first slot in a first transverse cross section of the housing, the first removable downhole antenna segment comprising at least one coil;

inductively coupling a signal from the longitudinally bored inner cavity to the earth formation;

using in the borehole, a second removable downhole antenna segment disposed in the corresponding second slot, the second slot in a second transverse cross section of the housing, the second removable downhole antenna segment comprising at least one coil; and inductively coupling a signal from the earth formation to the longitudinally bored inner cavity.

35. The method of claim 34 wherein using in the borehole, a first removable downhole antenna segment disposed in the first slot, comprises:

using in the borehole on the first removable downhole antenna segment, a first coil and a second coil, the first coil disposed near the longitudinally bored inner cavity and the second coil disposed near the outer surface.

36. The method of claim 35 wherein inductively coupling a signal from the longitudinally bored inner cavity to the earth formation comprises inductively coupling a signal from a coil on a probe disposed in the longitudinally bored inner cavity to the first coil.

37. The method of claim 34 using in the borehole, a second removable downhole antenna segment disposed in the second slot, comprises:

using in the borehole on the second removable downhole antenna segment, a first coil and a second coil, the first coil disposed near the longitudinally bored inner cavity and the second coil disposed near the outer surface.

38. The method of claim 36 wherein inductively coupling a signal from the earth formation to the longitudinally bored inner cavity comprises inductively coupling a signal from the first coil to a coil on a probe disposed in the longitudinally bored inner cavity.

* * * * *